(12) United States Patent
Fink et al.

(10) Patent No.: US 9,979,924 B1
(45) Date of Patent: May 22, 2018

(54) VEHICLE VIDEO CAMERA/RECORDER INITIATED EMERGENCY CALLING

(71) Applicant: Ambarella, Inc., Santa Clara, CA (US)

(72) Inventors: Alexander Fink, Castro Valley, CA (US); Shimon Pertsel, Mountain View, CA (US)

(73) Assignee: Ambarella, Inc., Santa Clara, CA (US)

( * ) Notice: Subject to any disclaimer, the term of this patent is extended or adjusted under 35 U.S.C. 154(b) by 0 days. days.

(21) Appl. No.: 14/179,715

(22) Filed: Feb. 13, 2014

(51) Int. Cl.
| | |
|---|---|
| *H04N 5/77* | (2006.01) |
| *H04N 7/18* | (2006.01) |
| *H04N 11/04* | (2006.01) |
| *B60K 28/10* | (2006.01) |
| *B60K 28/14* | (2006.01) |
| *H04M 1/725* | (2006.01) |
| *H04N 5/92* | (2006.01) |
| *H04W 4/22* | (2009.01) |

(52) U.S. Cl.
CPC .......... *H04N 5/77* (2013.01); *H04M 1/72536* (2013.01); *H04N 5/9201* (2013.01); *B60K 28/14* (2013.01); *H04W 4/22* (2013.01)

(58) Field of Classification Search
CPC ............ H04N 5/77; H04N 7/18; H04N 7/183; H04M 11/04; B60K 28/10; B60K 28/14; G05D 1/00; G07C 5/008
USPC ......... 386/228; 180/274, 282; 348/148, 143; 455/404.2; 701/33.4
See application file for complete search history.

(56) References Cited

U.S. PATENT DOCUMENTS

| | | | | |
|---|---|---|---|---|
| 5,278,759 | A * | 1/1994 | Berra et al. ........................ 701/1 |
| 5,969,598 | A * | 10/1999 | Kimura ......................... 340/436 |
| 6,510,325 | B1 | 1/2003 | Mack et al. ................ 455/575.2 |
| 6,690,302 | B1 * | 2/2004 | Inomata ........................ 340/989 |
| 2003/0081121 | A1 * | 5/2003 | Kirmuss ................. B60R 11/02 348/143 |
| 2007/0219685 | A1 * | 9/2007 | Plante ................... G06F 9/4443 701/33.4 |
| 2013/0188050 | A1 * | 7/2013 | Winget ................. G08G 1/168 348/148 |
| 2013/0267194 | A1 * | 10/2013 | Breed ......................... 455/404.2 |
| 2014/0032718 | A1 | 1/2014 | Berger et al. ................. 709/219 |
| 2014/0057590 | A1 | 2/2014 | Romero ...................... 455/404.2 |
| 2014/0313336 | A1 * | 10/2014 | Predmore, II ................ 348/148 |

* cited by examiner

*Primary Examiner* — Thai Tran
*Assistant Examiner* — Syed Hasan
(74) *Attorney, Agent, or Firm* — Christopher P. Maiorana, PC

(57) ABSTRACT

A system includes a processing device and a personal communication device. The processing device may be configured to (i) be mounted in a vehicle, (ii) detect conditions indicative of an accident, (iii) communicate collected data to the personal communication device via a wireless protocol, and (iv) initiate an emergency call using the personal communication device. The personal communication device may be configured to upload at least a portion of the collected data to a remote location in response to the emergency call being initiated.

20 Claims, 6 Drawing Sheets

(a)

(b)

(a)

(b)

US 9,979,924 B1

VEHICLE VIDEO CAMERA/RECORDER INITIATED EMERGENCY CALLING

FIELD OF THE INVENTION

The present invention relates to vehicle safety generally and, more particularly, to a vehicle video camera/recorder capable of initiating an emergency call.

BACKGROUND OF THE INVENTION

Automotive manufactures provide a subscription service that allows emergency calling in case of an accident. Such services depend on the installation and operation of specialized hardware devices. These services provide only limited amounts of data. Portable video cameras/recorders (such as dash cameras used in automotive applications) capture video footage in memory or on flash cards within the camera. Dash cameras include sensors capable of detecting vehicle motion and position.

It would be desirable to implement a vehicle video camera/recorder capable of initiating an emergency call.

SUMMARY OF THE INVENTION

The present invention concerns a system including a vehicle camera and a user device. The vehicle camera may be configured to (i) be mounted in a vehicle, (ii) generate and store a video sequence, (iii) detect conditions indicative of an accident, (iv) communicate the video sequence to the user device via a wireless protocol, and (v) initiate an emergency call using the user device. The user device may be configured to upload at least a portion of the video sequence to a remote location in response to the emergency call being initiated.

The objects, features and advantages of the present invention include providing a vehicle video camera/recorder capable of initiating an emergency call that may (i) transfer a video file and/or stream to a user device in response to detecting conditions indicative of an accident, (ii) initiate the emergency call using the user device, (iii) transfer details regarding vehicle activity over a period starting prior to and continuing after an accident, (iv) transfer detailed information (e.g., direction, motion, acceleration, surroundings, location, etc.) to assist emergency responders in determining vehicle location, (v) transfer a video file, a video stream, and/or a detailed data log using a wireless protocol, (vi) be moved between multiple vehicles, and/or (vii) operate with multiple user devices.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

In various embodiments, an emergency call functionality is implemented using a dash camera and a common cellular (or smart) phone—both available in the aftermarket—with no professional installation needed. In addition, extensive documentation of events that led to and/or followed an accident, including GPS data and video footage, along with GPS location and other such data may be provided in real-time to potentially assist in a rescue effort. When a determination is made that an accident has occurred—for instance, by cross-correlating g-force sensor (accelerometer) data with GPS and/or video data (e.g. a large shock plus a sudden stop)—a device in accordance with an embodiment of the invention may initiate a call from the cellular phone to a preset number (e.g., 911, an emergency contact, or a call-center that provides services on a subscription basis, etc.).

Figure 1:
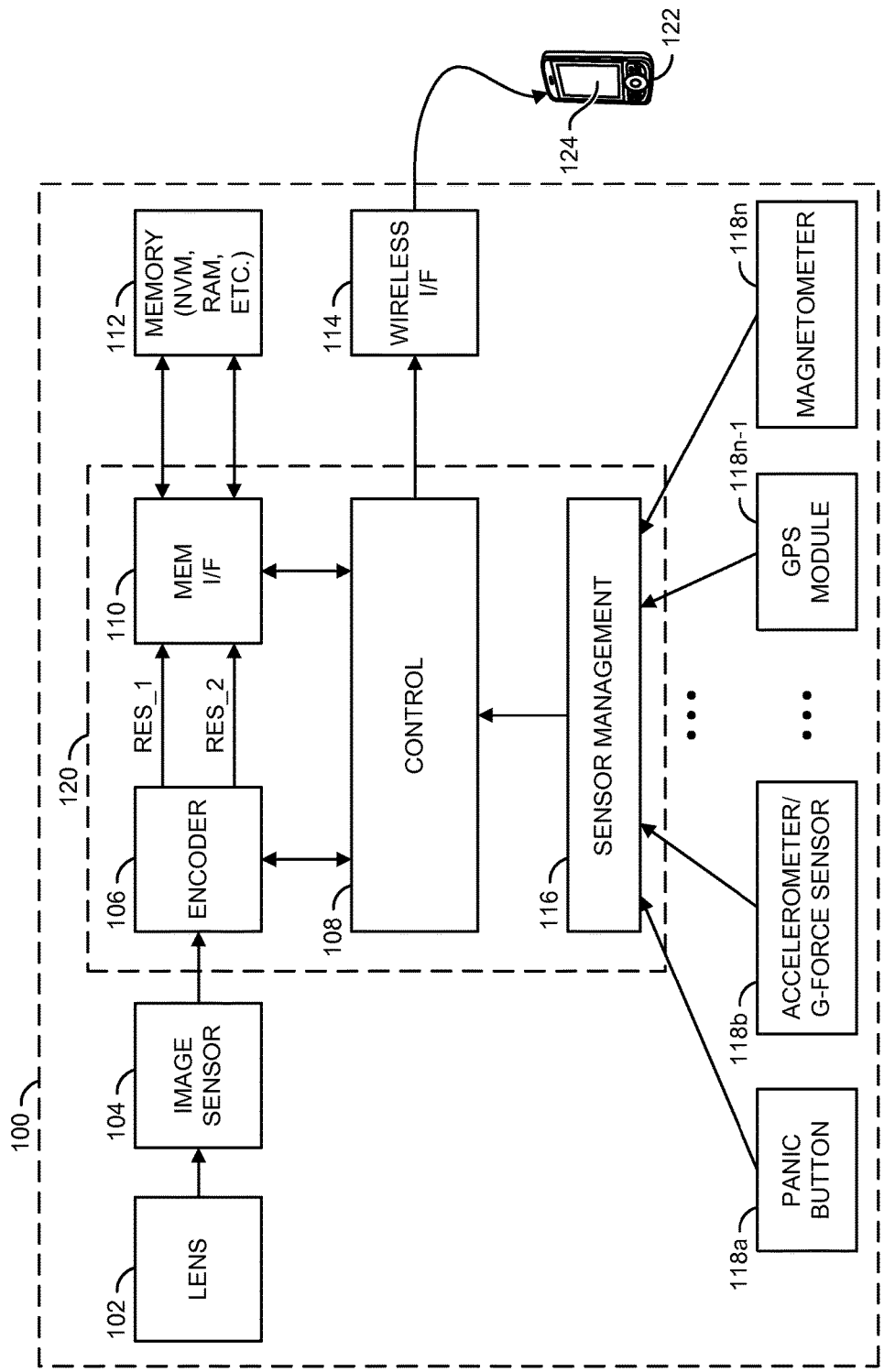
FIG. 1 is a diagram illustrating a vehicle video camera/recorder system in accordance with an example embodiment of the present invention.

Referring to FIG. 1, a block diagram of a device 100 is shown illustrating a video camera/recorder system in accordance with an example embodiment of the present invention. In one example, the device (or apparatus) 100 may comprises a block (or circuit) 102, a block (or circuit) 104, a block (or circuit) 106, a block (or circuit) 108, a block (or circuit) 110, a block (or circuit) 112, a block (or circuit) 114, a block (or circuit) 116 and a number of blocks (or circuits) 118a-118n. The blocks 106-118n may be implemented in hardware, software, firmware, or any combination thereof, and in one or multiple apparatuses (or devices).

In various embodiments, the device 100 may be implemented as a high-resolution (or high-definition) video camera/recorder. The device 100 may be operational to capture one or more video and/or audio streams (or clips) and collect various types of sensor information (data). In some embodiments, the device 100 may be operational to capture one or more high-bitrate (e.g., high resolution, etc.) video streams (or clips), corresponding lower bitrate (e.g., lower resolution, lower frame rate, higher predicted frames to reference frame ratio, altered quantization parameters, etc.) video streams (or clips), audio streams (or clips), and/or collect motion and position information. The video streams may be captured using the block 102 (e.g., a lens and associated actuator(s)) and the block 104 (e.g., an electro-optical sensor). The high-bitrate video streams (e.g., RES_1) and/or the lower bitrate video streams (e.g., RES_2) may be generated (e.g., processed, encoded, compressed, etc.) by the block 106 (e.g., an encoder). The block 106 may be operational to generate, process, and encode the video streams RES_1 and RES_2 using one or more proprietary and/or standard still and/or video codecs (e.g., JPEG, MJPEG, MPEG-2, MPEG-4, H.264, HEVC, etc.).

The low-bitrate video clips may contain the same content captured at the same time from the same point of view as the corresponding high-bitrate video clips. In some embodiments, the low-bitrate video clips may be a downscaled copy of the high-bitrate video clips. In other embodiments, the low-bitrate video clips and the high-bitrate video clips may be captured in parallel. For example, each frame captured by the block 106 may be processed as high-bitrate video and processed as downscaled low-bitrate video. In some embodiments, the low-bitrate video stream may be generated from the high-bitrate video stream through transcoding. In some embodiments, the higher bitrate stream may be decoded and then re-encoded into the lower bitrate stream.

The block 108 (e.g., a control circuit) may be configured to manage the block 106 and the block 110 (e.g., a memory interface) to store the video streams RES_1 and RES_2 in the block 112 (e.g., a memory). The block 112 may be implemented using various volatile (e.g., SRAM, DRAM, etc.) and/or non-volatile (e.g., flash, SD-card, xD-picture card, subscriber identity module (SIM) card, etc.) memory technologies. The block 108 may be further configured to communicate (e.g., transfer) at least a portion (e.g., a video stream, one or more short video clips, one or more still pictures, an audio stream, one or more audio clips, etc.) of High-res video data, low-bitrate video data, and/or audio data stored in the block 112 to an external device (e.g., a user device 122) via the block 114 (e.g., a wireless communication interface). For example, the block 114 may be configured to support one or more of, IEEE 802.11, IEEE 802.15, IEEE 802.15.1, IEEE 802.15.2, IEEE 802.15.3, IEEE 802.15.4, IEEE 802.15.5, IEEE 802.20, Bluetooth®, and/or ZigBee®.

The block 108 may be configured to initiate the transfer of the video data, the audio data, and/or the log (collected) data to the external device 122 in response to a determination that an emergency call needs to be made. In various embodiments, the block 108 may be configured to determine whether to make an emergency call based upon an analysis (e.g., using real-time analytics) of video, audio, and/or one or more signals from the block 116 (e.g., a sensor management module). The block 108 may be configured to make the emergency call in response to at least one of a number of predetermined emergency-related events occurring (e.g., a large shock plus vehicle movement suddenly ceasing, a sudden lane change followed by a large shock, etc.). In various embodiments, detection of the occurrence of the predetermined emergency-related event(s) is accomplished using the blocks 118a-118n (e.g., a panic button, a g-force sensor (accelerometer), a GPS module, a magnetometer, etc.) and/or video and/or audio streams. In some embodiments, the block 108 may be configured to transfer a live video stream in addition to the stored portion being transferred from the block 112. In some embodiments, the blocks 106, 108, 110, and 116 may be implemented together as a processor 120. The processor 120 may be implemented as one or more integrated circuits.

In some embodiments, the device 100 is implemented as a camera including wireless (e.g., WiFi, Bluetooth®, ZigBee®, etc.) connectivity. The addition of WiFi, ZigBee®, and/or Bluetooth® wireless connectivity into the device 100 allows the device 100 to send video images, still images, audio clips, and/or collected data wirelessly to the user device 122 (e.g., a smart-phone, tablet, PDA, etc.), which can then upload the video, still images, audio clips, and/or collected data to a remote location (e.g., the Internet, a secure server, a cloud computer, a security service, a police department, an emergency responder, an ICE (in case of emergency) entry in a contact list, etc.). In one example, bandwidth may be reduced by uploading post-processed data instead entire video sequences (or clips). For example, the user device 122 may implement one or more protocols (e.g., GSM, CDMA, GPRS, UMTS, CDMA2000, 3GPP LTE, 4G/HSPA/WiMAX, SMS, etc.) associated with cellular telephone networks. By uploading the video clips, still images, audio clips, and/or collected (or post-processed) data to the Internet/Cloud via the user device 122, the emergency-related data is preserved for various reasons including but not limited to a case where the camera or memory (e.g., flash) card is damaged or destroyed.

A concern with streaming the video from the device 100 to the user device 122 includes a need to continue recording during streaming. Additionally, the video, audio, and/or log data may need to be uploaded quickly to the Internet/Cloud before the camera or the memory card is damaged. The emergency calling feature in accordance with an embodiment of the present invention may leverage dual-stream video encoding to record at least two streams, one with a first bitrate (e.g., at full high definition (HD) resolution) and one with a second bitrate (e.g., at a lower resolution, etc.). Both video streams may be stored on the memory (e.g., SD-card, etc.) of the device 100. The lower bitrate stream can be sent concurrently (in parallel) with the recording and generally takes less time than the higher bitrate stream to upload to the Internet/Cloud.

In various embodiments, the initiation of an emergency call and the transfer of the video, audio, and/or collected data from the device 100 to the user device 122 occurs automatically in response to the predetermined emergency-related event(s). For example, Android and iOS provide the capability to bring an application program (app) to the foreground based on an external notification. The device 100 sends such a notification over, for example, a WiFi or Bluetooth channel, and the user device 122 either brings a running app to the foreground, or launches the app and brings the app to the foreground. The app then initiates a call, either using the stock OS dialer, a 3rd party app (e.g., Skype®, etc.), or a custom implemented voice call functionality. In some embodiments, the data may be transferred also when the camera user presses a "panic button" on the camera or in some other convenient location (e.g., on a steering wheel, on a key fob, etc.). In addition to emergency-related events, the collected (logged) data (e.g., direction, location, road signs, driving activity, weather conditions, video, audio etc.) may be transferred to the user device 122 (e.g., smart-phone, tablet, PDA, etc.) or a mass storage device hidden within the vehicle or through the user device to a remote location (e.g., onto a cloud service, etc.) periodically. In various embodiments, the collected or logged data may include data captured from various sensors and/or video and data generated through processing and/or analytics performed using the captured data and/or video.

In response to the occurrence of an emergency-related event, the device 100 automatically communicates with an application on the user device 122 and sends at least a portion (e.g., the last seconds) of the previously recorded video stream (or clip or still images) to the user device 122. The video stream may be uploaded in a series of smaller video clips to maximize the amount of video sent to the Internet/Cloud. The video data may be sent as a number of still images also.

In various embodiments, the application on the user device 122 is configured to call a predetermined emergency number (e.g., 911, ICE, etc.), store the video, audio, and/or log data received from the device 100, and automatically upload the video, audio, and/or log data to the Internet/Cloud, where the video data is saved for future inspection (e.g., by emergency responders, as evidence, etc.). By initiating the transfer of the data in response to occurrence of an emergency-related event rather than continuously uploading data, the video camera/recording system in accordance with an embodiment of the present invention generally ensures preservation of a record of the event, while minimizing costs related to the use of the user device to upload the video data to the Internet/Cloud. Such costs may include, but are not limited to, air time and/or data fees, storage space fees, reduced performance of the user device due to resource sharing needed to support a continuous upload, reduced battery life, cell network congestion, etc.

Aside from initiating the call, the device 100 may be configured to upload information that can be useful either in real-time (e.g., to facilitate rescue), or after the fact (e.g., as evidence of what happened). Such information may include, but is not limited to:

a) GPS location;

b) a video and/or audio recording of the last N seconds before the incident, and possibly M seconds after the incident;

c) a live feed from the camera;

d) a log file of data collected by various analysis routines running on the device 100, including but not limited to (i) a gps location history, (ii) an accelerometer/magnetometer history (e.g., to determine orientation), (iii) a forward collision warnings log, (iv) a lane departure warnings log, (v) a g-force sensor warnings log, (vi) a weather conditions log, and/or (vii) recognition of objects and/or conditions (e.g., pedestrians, road signs, traffic lights, road work, uniformed police officers, police cars, weather, road lanes, etc.) using analytical techniques. Such information can be shared with rescue personnel in real time, or alternatively uploaded to a private cloud in encrypted form as evidence of the incident, through the app that has been launched on the user device 122 (e.g., the device 100 uploads to the user device 122 and the user device 122 uploads to the cloud using one or more wireless protocols). For example, the camera 100 might upload to the user device 122 using Wi-Fi, Bluetooth®, Zigbee®, 3G/4G, near-field communication (NFC), or other communication protocol, and the user device 122 uploads to the internet/cloud using 3G/4G, Wi-FI (e.g., MCTCP protocol), or other communication protocol. In some embodiments, the device 100 may be enabled to connect directly to an antenna or hot spot (e.g., avoiding use of the user device 122 as a middleman). The MCTCP protocol may be used to allow concurrent connections to the device 100 (e.g., over WiFi) and the cell phone network (e.g., over 3G/4G). Another option might be to enable tethering.

Figure 2:
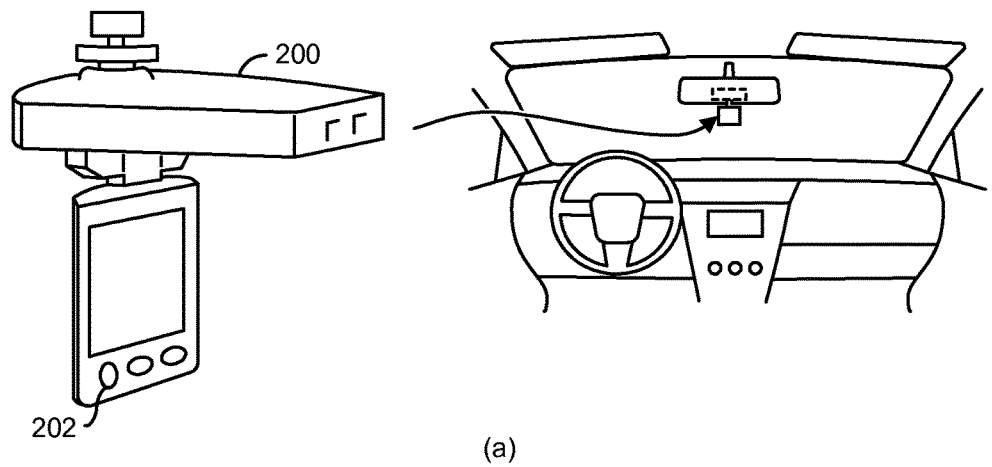
FIG. 2 is a diagram illustrating an example application of the video camera/recorder system of FIG. 1.
Figure 2:
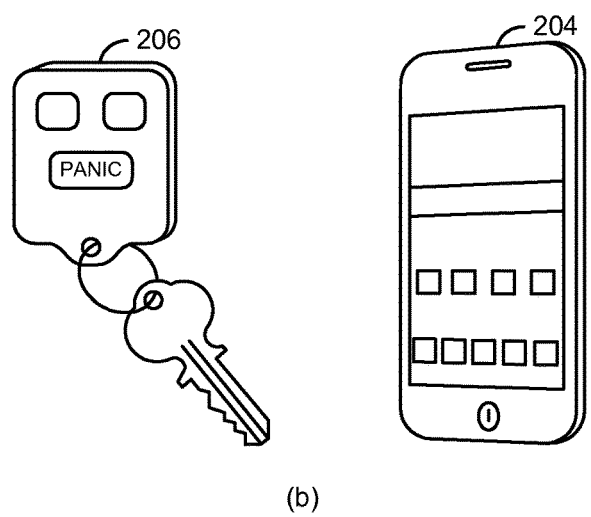

Referring to FIG. 2, a diagram is shown illustrating an example embodiment of the device 100 of FIG. 1 in the context of an automobile. In one example, the device 100 may be implemented as part of a dash camera (or dashcam) 200. The dashcam 200 may be configured to be mounted on or near a windshield, a rearview mirror, a dashboard, etc. of a vehicle. In some embodiments, the dashcam 200 may be configured to be mounted on a motorcycle helmet or glasses. The dashcam 200 may be configured to continuously record video and/or audio (e.g, in a loop) and/or log data. Thus, the dashcam 200 may serve, for example, as a "black box" recorder. For example, the dashcam 200 may be used to record video footage relating to (i) car accidents, (ii) bogus accident scams, (iii) threatening behavior by assailants, (iv) interactions with police, and/or (v) operation and surroundings of the vehicle in general.

In response to an emergency-related event, the dashcam 200 transfers at least a portion of recorded data to a user device 204 (e.g., a cellular telephone, smart phone, tablet computer, personal digital assistant (PDA), etc.) using a wireless protocol. In some embodiments, the dashcam 200 may include a panic button 202. In some embodiments, the panic button 202 may be disposed in a location other than on the dashcam 200, for example, on a steering wheel, vehicle dashboard, key fob 206, etc. Locating the panic button 202 in a location other than on the dashcam 200 generally allows the emergency calling feature in accordance with an embodiment of the present invention to be activated when a passenger of the vehicle has limited mobility due to an accident. The automatic initiation upon detection of an accident condition allows the emergency calling feature in accordance with an embodiment of the present invention to be activated when a passenger of the vehicle is incapacitated.

Figure 3:
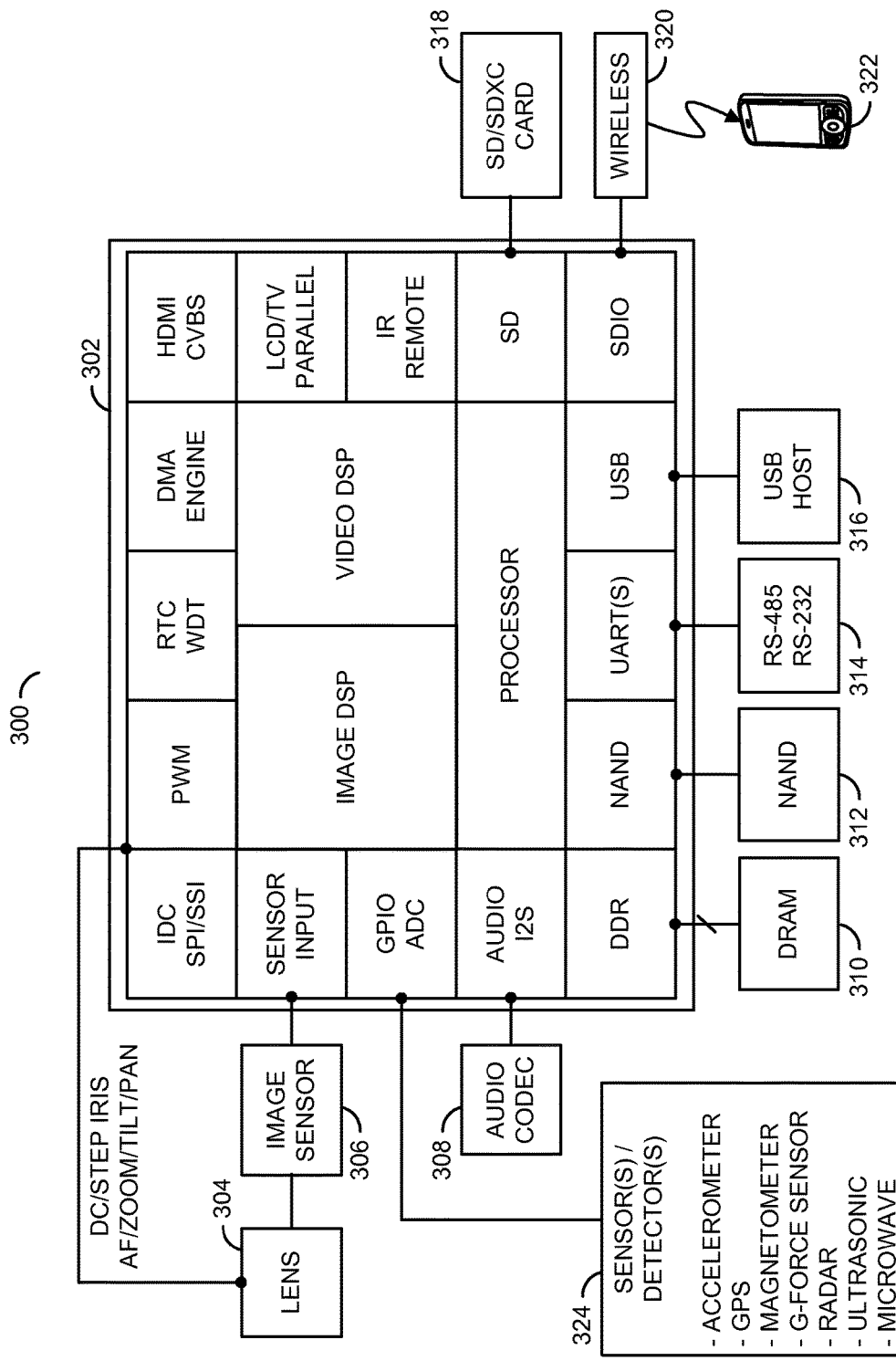
FIG. 3 is a diagram illustrating an example implementation of the video camera/recorder system of FIG. 1.

Referring to FIG. 3, a block diagram of a camera system 300 is shown illustrating an example implementation of a camera/recorder system in accordance with an embodiment of the present invention. In one example, the electronics of the camera system 300 may be implement as one or more integrated circuits. For example, an application specific integrated circuit (ASIC) or system on chip (SOC) may be used to implement a processing portion of the camera system 300. In various embodiments, the camera system 300 may comprise a camera chip (or circuit) 302, a lens assembly 304, an image sensor 306, an audio codec 308, dynamic random access memory (DRAM) 310, non-volatile memory (e.g., NAND flash memory) 312, one or more serial interfaces 314, an interface 316 for connecting to or acting as a USB host, an interface for connecting to a removable media 318 (e.g., SD, SDXC, etc.), a wireless interface 320 for communicating with a portable user device 322, and an interface for communicating with one or more sensors 324. In some embodiments, the lens assembly 304 and image sensor 306 may be part of a separate camera that is connected to the processing portion of the system 300 (e.g., via a video cable, a HDMI (high definition media interface) cable, a USB (universal serial bus) cable, an ethernet cable, or wireless link)

In various embodiments, the circuit 302 may comprise a number of modules including, but not limited to a pulse width modulation (PWM) module, a real time clock and watch dog timer (RTC/WDT), a direct memory access (DMA) engine, a high-definition multimedia interface (HDMI), an LCD/TV/Parallel interface, a general purpose input/output (GPIO) and analog-to-digital converter (ADC) module, an infra-red (IR) remote interface, a secure digital input output (SDIO) interface module, an SD card interface, an audio I²S interface, an image sensor interface, and a synchronous data communications interface (e.g., IDC SPI/SSI). The circuit 302 may also include an embedded processor (e.g., ARM, etc.), an image digital signal processor (DSP) and a video DSP. In embodiments incorporating the lens assembly 304 and image sensor 306 in the system 300, the circuit 302 may be configured (e.g., programmed) to control the lens assembly 304 and receive image data from the sensor 306. The wireless interface 320 may include support for wireless communication by one or more wireless protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, and IEEE 802.20. The circuit 302 may also include support for communicating using one or more of the universal serial bus protocols (e.g., USB 1.0, 2.0, 3.0, etc.). The circuit 302 may also be configured to be powered via the USB connection. However, other communication and/or power interfaces may be implemented accordingly to meet the design criteria of a particular implementation.

Figure 4:
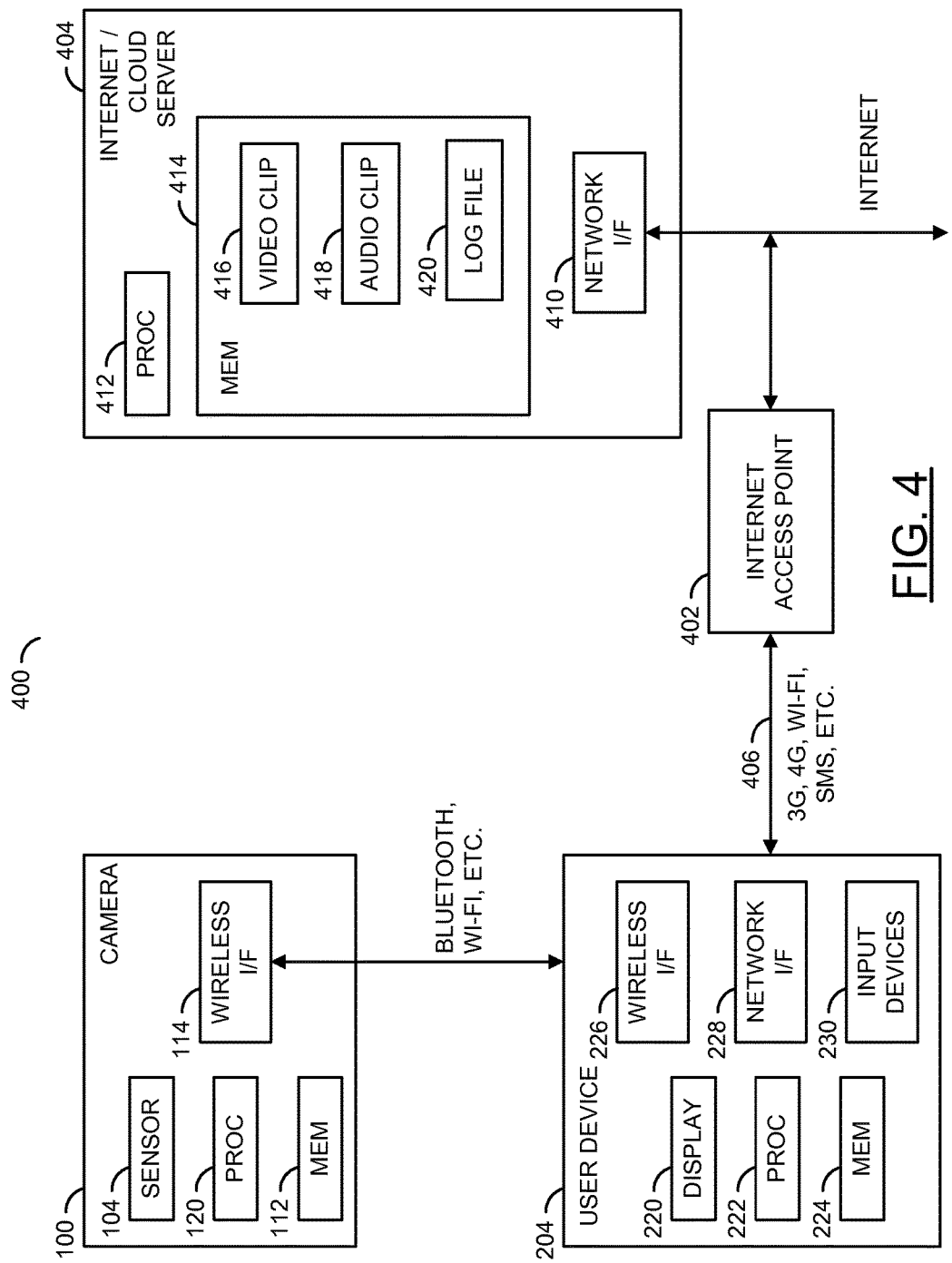
FIG. 4 is a block diagram of an emergency notification system implemented in accordance with an embodiment of the present invention.

Referring to FIG. 4, a block diagram of a vehicle security system 400 is shown. In one example, the vehicle security system 400 may include a block (or circuit) 402 (e.g., an internet access point) and a block (or circuit) 404 (e.g., a video cloud server). The block 404 may implement one or more internet/cloud servers. In one example, the block 404 may include a block 410 (e.g., a network interface), a block 412 (e.g., a shared processor resource), and a block 414 (e.g., a shared non-volatile storage medium). The non-volatile storage medium 414 may be configured to store a video clip 416, an audio clip 418, and/or a log file 420. The block 414 may be include, but is not limited to, any type of storage media including floppy disk, hard disk drive (HDD), solid state disk or drive (SSD), magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic data.

In one example, the system 400 may be configured to operate with the system 100 of FIG. 1 and a user device 204 implementing an emergency calling feature in accordance with a preferred embodiment of the present invention. The system 100 may include a sensor 104, memory 112, a wireless interface (I/F) 114, and a processor 120 (described above in connection with FIG. 1). The user device 204 may include a display 220, a processor 222, memory 224, a wireless interface (I/F) 226, a network interface (I/F) 228, and input devices 230. In response to a predetermined emergency-related event, the device 100 may transfer video and/or audio clips and/or collected data to the user device 204 via the wireless interfaces 114 and 226. The user device 204 may be configured to display the videos using the display 220, store the video and/or audio clips and/or collected data in the memory 224, and/or upload the video and/or audio clips and/or collected data to the video cloud server 404 via the Internet and a network connection 406 between the network I/F 228 and the internet access point 402. The user device 204 may be further configured to call for emergency assistance.

Figure 5:
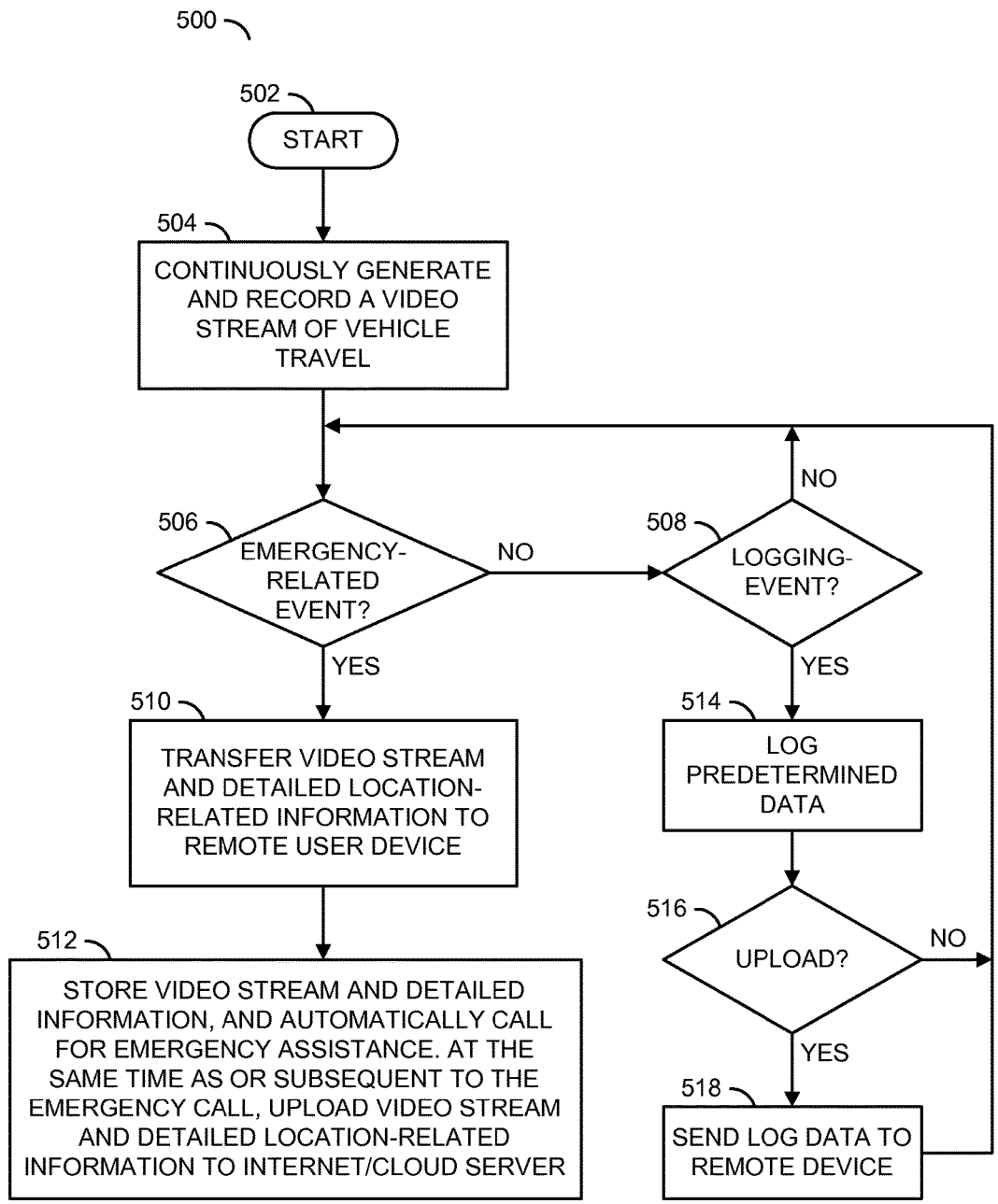
FIG. 5 is a flow diagram illustrating an example process in accordance with an embodiment of the present invention.

Referring to FIG. 5, a flow diagram is shown illustrating an example process 500 in accordance with an embodiment of the present invention. In some embodiments, the process (or method) 500 may comprise a step (or state) 502, a step (or state) 504, a step (or state) 506, a step (or state) 508, a step (or state) 510, a step (or state) 512, a step (or state) 514, a step (or state) 516, and a step (or state) 518. The process 500 generally begins with the step 502 (START) and moves to the step 504. In the step 504, the process 500 generates and records (stores) a video stream and collects data via a number of sensors. While the step 504 is being performed, the process 500 may perform steps 506 and 508. In the step 506, the process 500 determines whether one or more predetermined emergency-related events has occurred (e.g., an accident, a collision, a "panic button" is being pressed, etc.). In the step 508, the process 500 determines whether one or more logging events has occurred. When no predetermined emergency-related or logging events are being detected, the process 500 remains in the steps 504, 506 and 508.

When a predetermined emergency-related event is detected, the process 500 moves to the step 510, where at least a portion (e.g., short clip or clips, still images, etc.) of the video stream and collected data stored in the step 504 is transferred to a remote user device automatically. In some embodiments, a live video stream is transferred to the remote user device also. When the portion of the video stream has been transferred to the user device, the process 500 may move to the step 512. In the step 512, the remote user device is controlled to store and/or upload the data received in the step 510 to the Internet or a cloud server for preservation of a record associated with the predetermined emergency-related event.

When a logging event is detected, the process 500 moves to the step 514, where predetermined data (e.g., GPS information, motion information, analytic information of video data, etc.) logged (stored) automatically. The process 500 then moves to the step 516 and checks whether the collected data should be uploaded. If so, the process 500 moves to the state 518 where the log data is sent to the remote device. The remote user device may decide to store and/or upload the data received in the step 518 to the Internet or a cloud server for preservation of a record associated with the logging event. The process 500 then returns to the states 504, 506, and 508.

In various embodiments, log data may be accumulated as a comma-delimited text file, where each line includes the following entries (or fields): session ID, local date, local time, latitude, longitude, event_type:data/sub-data, . . . , where any number of event_type:data/sub-data fields can be included. For example, an entry might appear as: 37Ab57G8, 09/27/2013, 17:27.30, 3735.4485N, 12196.9204 W, lanes: 2/4. This entry could be read as: an anonymous camera was present in a specific location in Santa Clara, in the 2nd lane out of 4 lanes total, at 5:27 PM on Sep. 27, 2013.

The session ID field is used to cross-reference information between entries within one session. For example, a session could start with the generation of a random session ID when the device boots up, and the session ID could be reset (e.g., with a new ID generated) whenever the device stays in one location for a predetermined amount of time (e.g., 30 seconds or more). The session ID allows a specific driving route to be mapped, including lane information and speed at every point along the route, without being able to link the route to any specific device, or any other route. The session ID may be generated regardless of device, and regardless of previous session IDs. In some embodiments, the session ID may be formatted as 8 randomly generated alphanumeric characters, resulting in $62^8$ possibilities, or roughly $2*10^{14}$ IDs. While there is a slight chance that some session IDs could be identical by accident, the chance is extremely small. Whenever such rare collisions occur, the older instance could be discarded from the database on the server side (just to be safe) and save the new instance.

The local date may be stored in the MM/DD/YYYY format. The local date is used to correlate driving data to calendar days (e.g., to distinguish a difference between driving on Monday vs. Tuesday, or driving on a national holiday vs. a normal day). The local time is stored in the HH:MM.SS format. The local time may be used to correlate driving data collected at different times of day, and may also be used to calculate vehicle speed (e.g., by dividing the distance from previously reported coordinates by the time elapsed since the previous coordinates were sent), and the direction of vehicle movement. Latitude and longitude may be stored in the format used in NMEA 0183 (the standard output format on most GPS/GLONASS devices), which is XXXXX.XXXX, plus a letter denoting the azimuth. For example, 37.354485 degrees North may be stored as 3735.4485N. Event type may be implemented as an extensible field that allows the system to denote any number of different events, and attach this information to the standard time/location data that is mandatory in every message.

Examples of event types may include: lanes, g-force sensor, front-distance, weather, road-sign, road-work, police-car, etc. A lanes type event denotes the number of lanes on the road, and the specific lane in which the car is driving (e.g., the lanes data may originate in a routine that is running on an embedded CPU and analyzes the video data). The former is useful to map out static road conditions (which would be very useful to a map service), and the latter is useful to map out traffic patterns as a function of lanes, allowing drivers to develop optimal strategies on the road, and allowing governments to plan road construction and regulation in a way that would optimize traffic flow. The g-force sensor type event denotes a shock that was detected on the camera. The shock level, when combined with data on recent movement of the vehicle, may constitute proof of an accident, and may also provide a reason to log/upload data and initiate an immediate emergency phone call. The front-distance type event denotes the distance between the camera and a vehicle (or object) in front of the camera (e.g., in the same lane), as detected by a video analysis routine. The front-distance data allows for interpretation of the reason for variations in speed (e.g., lights, traffic, etc). The weather type event denotes weather conditions, as detected by a video analysis routine. The weather type data may be useful in analyzing variations in speed and or driving habits. The road-sign event denotes that a road sign has been detected by the video analysis routine, and specifies which particular sign. The road-work type event denotes that road workers (or alternatively, orange cones) have been detected by the video analysis routine. This fact may later help analyze the effects of road work on traffic patterns, and help governments plan road work in a way that minimizes traffic delays. The police-car type event denotes that a police car has been detected by the video analysis routine. This fact may later help analyze the effects of police cars on traffic patterns. In general, the specified format allows extensibility for other types of information to be added later on. Data may be aggregated from multiple vehicles to build more detailed maps (e.g., with lane information and more detailed traffic information).

In general, a message refers to a line of text that is saved to a file on the non-volatile storage of the camera device. The actual data may be transferred out of the system fairly infrequently (e.g. whenever the file size exceeds 100 KB of data). The frequency of periodic messages is generally configurable. In some embodiments, a default may be implemented, for example, to send messages as follows.

For a "lanes" event:
1. Invoke the "TryToSendMessage( )" routine every second (based on timer interrupt).
2. In the routine, check: if distance(current location, previous location)>1/60th of a mile, send; otherwise do not send.

This setup means that when the car travels at 60 mph, messages are sent once every second; when the car travels at 20 mph, messages are sent once every 3 seconds; etc. All other events are concatenated to the next "lanes" message as additional event_type:data/sub-data fields.

The above scheme implies the following space/bandwidth requirements. An average message size is roughly 60 bytes of data (the effect of events other than "lanes" is negligible). This would imply, for cars traveling at speeds <60 mph, roughly: 60 bytes*60 messages per mile=3600 bytes per mile traveled. Assuming the average car travels about 41 miles per day (15,000 miles per year divided by 365 days in a year): about 148 KB of data per device per day would need to be uploaded. Whenever the car travels at speeds higher than 60 mph, the number will actually be lower (since messages are sent only once per second, spacing them out more than 1/60th of a mile apart).

In various embodiments, the log file is maintained in a standard encoded format (e.g., similar to the manner in which the /etc/passwd file is stored on most Linux systems). Once the log file is to be transmitted to the user device, the log file is read to memory, decoded to plain text, encrypted using PGP with the public key of the destination server, and finally transmitted to the user device in the encrypted form. Since data collected from all devices is routed through the same app to the same server, public keys can be changed from time to time as follows:

Upon startup, the app queries the server whether the public key has changed;

From time to time, the server responds with a new public key; If a new public key is provided, the new public key is sent to the connected device using the AMBA_SET_PUB-LIC_KEY command in the Wireless Connectivity API. The data is decrypted on the server side using the private key of the server (which corresponds to the public key used for encryption).

Data collection carries considerable legal and PR-related risks. Therefore data collection needs to be approached carefully. For example, special consideration needs to be given to privacy concerns. The privacy issue is addressed by the use of the session ID field which, while consistent throughout a session, is re-set as soon as the vehicle stops for 30 seconds or more. This means that there is no way to connect a route taken today to a route taken yesterday (since the two routes would have different session IDs), and no information mapping any session ID to any specific device is stored. The session ID is needed because without an id that is consistent throughout the session, it would be impossible to understand the traffic patterns as perceived by a specific vehicle; in fact, even calculating travel speed involves cross-correlating two separate messages denoting location, which is only possible with a unique session ID.

Aside from data collection, some of the information gathered by the system 100 may be used in real-time. Since the system 100 has the ability to launch an application on the user device 122 proactively (e.g., as long as the user device 122 is powered on), this information can be used, for instance, to provide emergency services to the user. The combination of a substantial shock (e.g., detected by a g-force sensor) and a vehicle that was previously moving and has now stopped can be a good indicator of an accident. In such a case, the system 100 may:
1. Automatically upload a part of the recorded video to a private cloud, if connection allows;
2. Automatically "save" all previous messages in this session ID and upload to a private cloud, along with the video from item #1; and
3. Automatically dial 911 (or another pre-set number) from the user device (e.g., smartphone, etc.).

Figure 6:
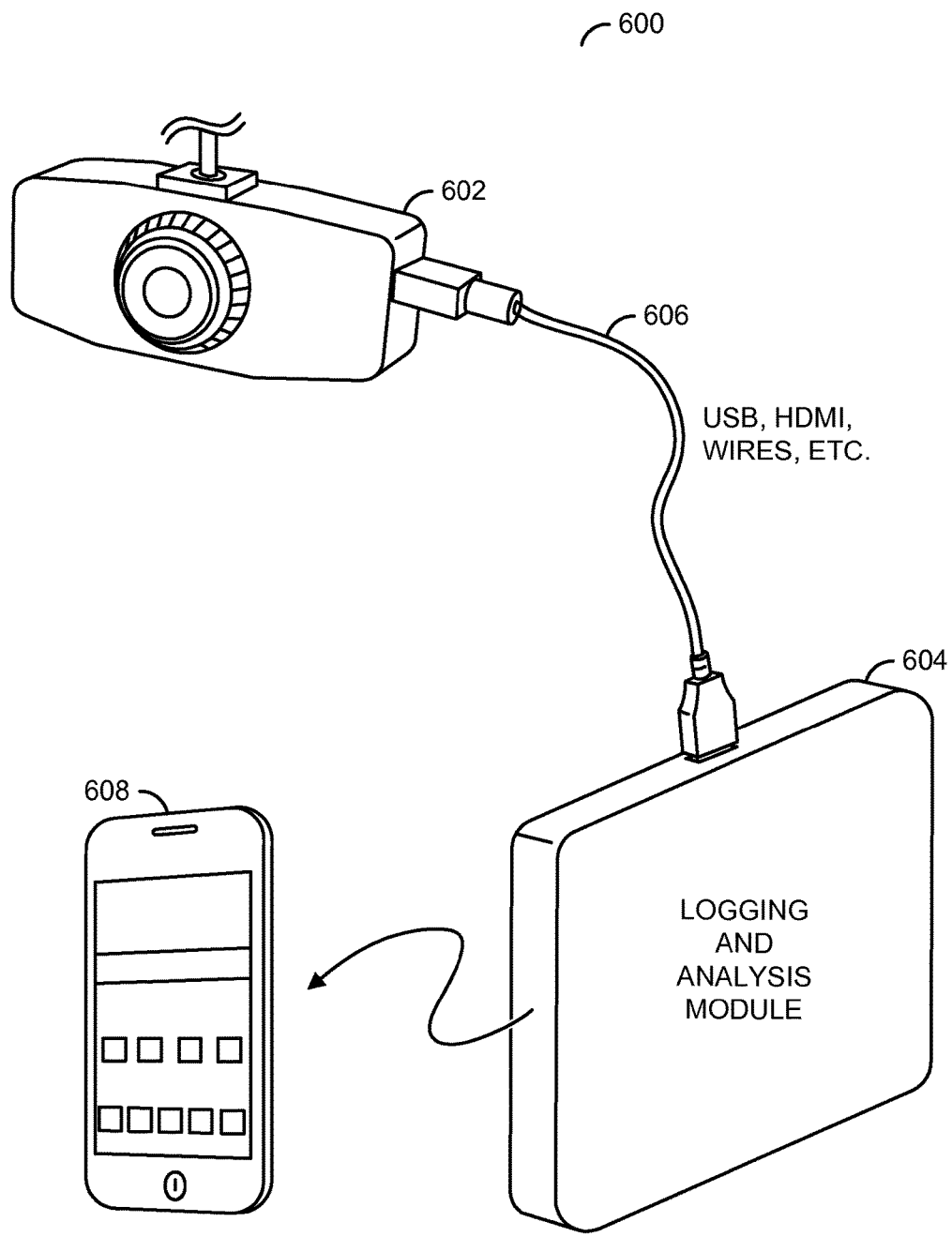
FIG. 6 is a diagram illustrating a camera and separate analysis module in accordance with an example embodiment of the present invention.

Referring to FIG. 6, a diagram is shown illustrating a system 600 in accordance with another example embodiment of the present invention. In some embodiments, the system 600 may comprise a camera 602 and a separate analysis module 604. The camera 602 and the analysis module 604 are generally configured to be removably attached to a vehicle. Thus, the camera 602 and the analysis module 604 may be moved easily from one vehicle to another by a user. The camera 602 may be connected to the analysis module using a cable 606 or wireless link. The cable 606 may be implemented, for example, as a universal serial bus (USB) cable, a high definition media interface (HDMI) cable, or a composite video (e.g., s-VGA) cable. However, other appropriate connections may be implement to meet the design criteria of a particular implementation. The analysis module 604 is generally configured to handle communication with a user device 608 as described above.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more integrated circuits, one or more chips or die arranged as flip-chip modules and/or multi-chip modules or by interconnecting an appropriate network of conventional component circuits, as is described herein, modifications of which will be readily apparent to those skilled in the art(s).

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to the preferred embodiments thereof, it will be understood by those skilled in the art that various changes in form and details may be made without departing from the scope of the invention.

The invention claimed is:

1. A system comprising:
a dash camera comprising a processing device and configured to be removably mounted in a vehicle with a view of a direction ahead of said vehicle and no further installation to said vehicle, said dash camera further comprising one or more sensors configured to generate location data, orientation data, and motion data related to said vehicle; and
a personal communication device separate from said dash camera and said vehicle, wherein
(a) said processing device is configured to (i) collect said location data, said orientation data, said motion data and video, (ii) detect conditions indicative of an accident, and (iii) in response to detection of said conditions, automatically communicate collected data and a video sequence recorded prior to detection of said conditions to said personal communication device via a wireless protocol and automatically initiate an emergency call using said personal communication device, and
(b) said personal communication device is configured to automatically upload at least a portion of the collected data and the video sequence received from the processing device to a remote location in response to the emergency call being initiated.

2. The system according to claim 1, wherein said dash camera comprises a video camera that is (i) separate from said processing device and said personal communication device and (ii) configured to generate and store the video sequence, and said processing device is further configured to communicate the video sequence from said video camera to said personal communication device via said wireless protocol as part of said collected data.

3. The system according to claim 2, wherein said video camera is further configured to record a high resolution video sequence and a reduced bitrate video sequence in parallel, a bitrate of said reduced bitrate video sequence being reduced through at least one of lower resolution, lower frame rate, higher predicted frames to reference frame ratio, and change in one or more quantization parameters.

4. The system according to claim 1, wherein said dash camera is further configured to stream video live to said personal communication device in addition to uploading a portion of a stored video sequence.

5. The system according to claim 1, wherein said processing device is further configured to generate and store one or more of audio data and log data.

6. The system according to claim 5, wherein said log data comprises one or more of direction information, weather conditions, global positioning system (GPS) data, and motion information.

7. The system according to claim 1, wherein said processing device is configured to initiate said emergency call in response to one or more predetermined emergency-related events, and at least one of the predetermined emergency-related events comprises a large shock followed by vehicle motion stopping suddenly.

8. The system according to claim 1, wherein said processing device is further configured to analyze a video sequence to detect one or more of:
a number of lanes of a road currently being traveled;
a current lane of the number of lanes in which said vehicle is traveling;
road signs present along the road being traveled;
weather conditions; and
police vehicles being present.

9. The system according to claim 1, wherein said processing device comprises a wireless communication interface supporting one or more of Bluetooth, ZigBee, IEEE 802.11, IEEE 802.15, IEEE 802.15.1, IEEE 802.15.2, IEEE 802.15.3, IEEE 802.15.4, IEEE 802.15.5, and IEEE 802.20.

10. The system according to claim 1, wherein said dash camera is configured to be mounted on or near one or more of a windshield of a vehicle, a dashboard of said vehicle, a rear-view mirror of said vehicle, a motorcycle helmet, and a pair of eyeglasses.

11. The system according to claim 1, wherein said collected data is stored in a non-volatile memory.

12. The system according to claim 11, wherein said non-volatile memory is located remotely from said processing device.

13. The system according to claim 11, wherein said non-volatile memory comprises one or more of a flash memory, an SD card, an xD-picture card, a subscriber identity module (SIM) card.

14. A method of initiating an emergency call comprising:
removably mounting a camera in a vehicle with no further installation to said vehicle, wherein said camera operates independently of said vehicle, views a direction ahead of said vehicle, and comprises one or more sensors configured to generate location data, orientation data, and motion data related to said vehicle;
storing a video sequence generated by said camera;
detecting conditions indicative of an accident using said camera;
automatically communicating the video sequence stored prior to detecting said conditions to a user device separate from the camera and said vehicle via a wireless protocol in response to detecting said conditions;
automatically initiating an emergency call using said user device in response to detecting said conditions; and using the user device to automatically upload at least a portion of the video sequence received by the user device to a remote location in response to the emergency call being initiated.

15. The method according to claim 14, wherein said user device comprises at least one of a cellular telephone, a tablet computer, and a personal digital assistant.

16. The method according to claim 14, wherein said user device communicates said video sequence to at least one of a secure server, a cloud-based service, a security service, a police department, and a location associated with a predefined entry in a contacts list.

17. The method according to claim 14, wherein said conditions indicative of said accident comprise a large shock followed by vehicle motion stopping suddenly.

18. A method of preserving a record of an accident comprising:

removably mounting a camera in a vehicle with no further installation to said vehicle, wherein said camera operates independently of said vehicle, views a direction ahead of said vehicle, and comprises one or more sensors configured to generate location data, orientation data, and motion data related to said vehicle;

storing a video sequence generated by said camera;

logging data comprising one or more of direction information, weather conditions, global positioning system (GPS) data, and motion information using said camera;

detecting conditions indicative of an accident using said camera;

automatically communicating the stored video sequence and the logged data from prior to detection of said conditions to a user device separate from the camera via a wireless protocol in response to detecting said conditions indicative of said accident;

automatically initiating an emergency call using said user device in response to detecting said conditions indicative of said accident; and using said user device, automatically uploading at least a portion of the video sequence and the logged data to a remote location in response to the emergency call being initiated.

19. The method according to claim 18, wherein said user device is configured to upload said video sequence using a wireless protocol comprising one or more of GSM, CDMA, GPRS, UMTS, CDMA2000, 3GPP LTE, 4G/HSPA/Wi-MAX, and SMS.

20. The system according to claim 18, wherein said conditions indicative of said accident comprise a large shock followed by vehicle motion stopping suddenly.

* * * * *